(12) United States Patent
Howard, Jr.

(10) Patent No.: US 8,549,673 B2
(45) Date of Patent: Oct. 8, 2013

(54) PROTECTIVE ARTICLES CONTAINING N-HALOCHITOSAN

(75) Inventor: Edward George Howard, Jr., Hockessin, DE (US)

(73) Assignee: E I du Pont de Nemours and Company, Wilmington, DE (US)

( * ) Notice: Subject to any disclaimer, the term of this patent is extended or adjusted under 35 U.S.C. 154(b) by 644 days.

(21) Appl. No.: 12/328,245

(22) Filed: Mar. 9, 2009

(65) Prior Publication Data

US 2010/0223716 A1 Sep. 9, 2010

Related U.S. Application Data

(63) Continuation-in-part of application No. 11/593,958, filed on Nov. 7, 2006.

(51) Int. Cl.
*A41D 13/00* (2006.01)
*B32B 27/00* (2006.01)
*B32B 27/08* (2006.01)
*B27B 27/06* (2006.01)

(52) U.S. Cl.
USPC ......... 2/457; 428/421; 428/423.1; 428/474.4; 428/475.5; 428/480

(58) Field of Classification Search
None
See application file for complete search history.

(56) References Cited

U.S. PATENT DOCUMENTS

| | | | |
|---|---|---|---|
| 4,046,939 A | 9/1977 | Hart | |
| 4,275,194 A * | 6/1981 | Kato et al. | 536/20 |
| 4,433,024 A | 2/1984 | Eian | |
| 5,362,717 A | 11/1994 | Dingilian et al. | |
| 6,699,917 B2 | 3/2004 | Takashima | |
| 6,749,748 B1 * | 6/2004 | Macpherson et al. | 210/198.1 |
| 2007/0196404 A1 | 8/2007 | Howard et al. | |

OTHER PUBLICATIONS

Brzezinski et al., Structure and Properties of Microporous Polyurethane Membranes Designed for Textile-Polymeric Composite Systems, Fibres & Textiles in Eastern Europe, Jan./Dec. 2005, pp. 53-58, vol. 13, No. 6.
Fattah et al., Guide for the Selection of Chemical and Biological Decontamination Equipment for Emergency First Responders, NIJ Guide 103-00, Oct. 2001, vol. 1.
Huang et al., A Review on Polymer Nanofibers by Electrospinning and Their Applications in Nanocomposites, Composites Science and Technology, 2003, pp. 2223-2253, vol. 63.
Advanced Inorganic Chemistry by Cotton and Wilkinson, 4th Edition, 1980, p. 567, John Wiley & Sons, Interscience, New York (Book Not Included).
Standard Test Method for Resistance of Protective Clothing Materials to Permeation by Liquids or Gases Under Conditions of Continuous Contact, ASTM Designation: F 739-99A.

* cited by examiner

*Primary Examiner* — Jennifer Chriss
*Assistant Examiner* — Camie Thompson
(74) *Attorney, Agent, or Firm* — Kevin S. Dobson (57) ABSTRACT

Laminates made from films and powders of N-halochitosan are provided. The films and laminates can be used to make a variety of finished articles that can be used to provide protection from hazardous chemical and biological agents.

12 Claims, 1 Drawing Sheet

US 8,549,673 B2

PROTECTIVE ARTICLES CONTAINING N-HALOCHITOSAN

The present invention is a Continuation-in-Part of co-pending application Ser. No. 11/593,958, filed Nov. 7, 2006.

TECHNICAL FIELD

The present invention relates to structures prepared in part from continuous N-halochitosan films or N-halochitosan powder. In various embodiments, the structures are useful for fabrication as a protective article and are preferably substantially impermeable to hazardous chemical and biological agents, but sufficiently permeable to water vapor that, if worn as protective apparel, it is both protective and comfortable to wear.

BACKGROUND

There is a growing need for structures that provide personal protection against toxic chemical and biological agents. It is known to devise structures that are impermeable to toxic chemical vapors and liquids, but, when used as apparel, such structures are typically also hot, heavy and uncomfortable to wear.

The degree of comfort offered by apparel worn as a protective suit is significantly affected by the amount of water vapor that can permeate through the fabric from which the suit is made. The human body continuously perspires water as a method for controlling body temperature. When a protective fabric hinders the loss of water vapor from the body, the transpirational cooling process is hindered, which leads to personal discomfort. When a protective suit allows little or no loss of water vapor, extreme heat stress or heat stroke can result in a short period of time. Hence, it is desirable that, in addition to offering the highest levels of protection against toxic chemicals and liquids, a practical chemical and biological protective suit should have high water vapor transmission rates. It is also desirable that the appropriate protective structure be light in weight and offer the same high level of protection over a long period of time.

U.S. Pat. No. 5,362,717 discloses methods for preparing N-halochitosans, including N-chlorochitosan, N-bromochitosan, and N-iodochitosan. The N-halochitosans are used to induce flocculation of materials such as proteins, algae, carbohydrates, oils (edible and hydrocarbon), metallic oxides, poultry processing waste water and brewery sludge. The N-halochitosans were obtained and used as solids isolated by filtration or created in situ by adding a chitosan solution to the dispersion to be flocculated, then adding a halogenating agent.

The present disclosure provides selectively permeable laminates that contain N-halochitosan in the form of a continuous film or a powder and that can be used in articles for personal protection, providing improved wearer comfort compared with impermeable articles.

SUMMARY

One aspect of the present invention is a method of destroying or inhibiting the permeation of a chemically or biologically harmful agent through a laminate or a structure or item of apparel fabricated therefrom, by including within the laminate N-halochitosan in the form of a continuous film or a powder.

Another aspect of the present invention is a protective structure comprising N-halochitosan. In some embodiments, the N-halochitosan is provided in the form of a continuous film. In other embodiments, the N-halochitosan is provided in the form of a powder. In some embodiments, the structure is a laminate further comprising at least one layer of fabric.

A further aspect of the present invention is a finished article incorporating a laminate that comprises N-halochitosan in the form of a continuous film or a powder and at least one layer of fabric. Finished articles include items of apparel, shelters, and protective covers.

These and other aspects of the present invention will be apparent to one skilled in the art in view of the following description and the appended claims.

DETAILED DESCRIPTION

In the context of this disclosure, a number of terms shall be utilized.

The term "film" as used herein means a thin but discrete structure that moderates the transport of species in contact with it, such as gas, vapor, aerosol, liquid and/or particulates. A film may be chemically or physically homogeneous or heterogeneous. Films as used herein are less than about 0.25 mm thick.

The term "sheet" or "sheeting" as used herein means a film that is at least 0.25 mm thick.

The term "powder" as used herein means a solid that is small enough to pass through a 100 mesh, or finer, screen. Smaller particles, hence higher surface areas, are preferred.

"N-halochitosan" denotes a chitosan moiety in which a measurable amount of nitrogen has been halogenated, whether the halogenation occurs homogeneously throughout the material or is concentrated at the surface. Unless otherwise stated or apparent by the particular context, the term "N-halochitosan" as used herein includes N-halochitosan-based moieties including N-halochitosan itself, N-halochitosan salts, and N-halochitosan derivatives.

The term "nonporous" as used herein denotes a material or surface that does not allow the passage of air other than by diffusion.

The term "continuous N-halochitosan film" as used herein means an N-halochitosan film having at least one nonporous surface.

The term "permeable" as used herein means allowing liquids or gases to pass or diffuse through.

The term "selectively permeable" as used herein means allowing passage of certain species but acting as a barrier to others. The protective structures disclosed herein are selectively permeable in that they are highly permeable to water vapor but have very low permeability (thus, act as a barrier) toward chemical agents.

The term "laminate" as used herein means a material comprising two or more parallel layers of material that are at least partially bonded to each other. Bonding methods include but are not limited to sewing and the use of adhesives.

The term "substrate" as used herein means the material onto which a film is formed from solution.

The term "work device" as used herein denotes a substrate which is used only for film formation and does not subsequently become part of a laminate.

The term "soluble" as used herein denotes a material that forms a visibly transparent solution when mixed with a specified solvent.

The term "N-halochitosan solution" as used herein indicates that at least one N-halochitosan moiety is dissolved in the indicated solvent. However, materials that are insoluble in the indicated solvent may also be present.

The term "(in)solubilize" as used herein means to render a material (in)soluble in a specified solvent.

The term "toxin" as used herein means a poisonous substance, typically a protein or mixture of proteins, produced by a living organism (e.g., plants, animals, or pathogenic bacteria). A toxin typically has a high molecular weight (as compared to a simple chemical poison), is antigenic (elicits an antibody response), and is highly poisonous to living creatures.

The term "harmful to human health" as used herein means causing injury to humans as a consequence of acute or chronic exposure through dermal contact, ingestion, or respiration.

In preferred embodiments, the N-halochitosan films and laminates made comprising N-halochitosan films or N-halochitosan powder are substantially impermeable to certain biological and/or chemical agents. It is often desirable that the films and laminates be at least 99% impermeable to certain agents, even up to 100% impermeable.

In one embodiment, the present invention provides a protective structure, fabricated from a continuous chitosan film or a selectively permeable laminate containing N-halochitosan in the form of a continuous film or a powder. "Structure", as used herein with regard to structures fabricated from continuous N-halochitosan film, includes single layers and multiple layers of continuous N-halochitosan films. N-halochitosan films can be used to make laminates. The structures can be used in articles and items of apparel that protect against exposure to a chemical or biological agent that is harmful to human health. Specific embodiments include finished articles, including articles of apparel, fabricated from a continuous N-halochitosan film or a selectively permeable laminate containing N-halochitosan in the form of a continuous film or a powder.

In other embodiments, the invention provides methods of inhibiting the permeation of a chemically or biologically harmful agent through a selectively permeable laminate, or through an article or item of apparel fabricated therefrom, by including within the selectively permeable laminate N-halochitosan in the form of a continuous film or a powder.

In further embodiments the invention provides methods of fabricating a structure that protects against exposure to a chemical or biological agent that is harmful to human health, and methods of fabricating items of apparel, by incorporating into a structure or item of apparel a selectively permeable laminate containing N-halochitosan in the form of a continuous film or a powder.

Figure 1:
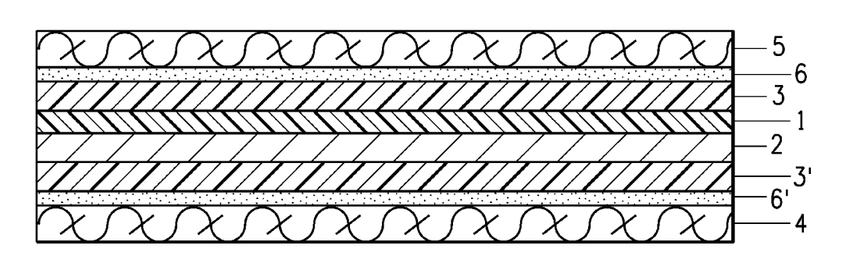
FIG. 1 is a schematic diagram showing the structure of one type of selectively permeable laminate according to an embodiment of the present invention.

In some embodiments, the selectively permeable laminates described herein contain a continuous N-halochitosan film. In one embodiment, the laminate is an N-halochitosan film deposited from solution onto a substrate. In another embodiment, the laminate is an N-halochitosan film adhered to a layer, for example, polyurethane film by thermal bonding. In another embodiment, a continuous N-halochitosan film or an N-halochitosan film cast onto a substrate, or an N-halochitosan film thermally bonded to another layer is bonded to one or more layers of fabric, by adhesive. The adhesive can be in the form of stripes or, preferably, dots, to provide a discontinuous layer of adhesive, in order not to block passage of gases and/or liquids through the selectively permeable laminate. FIG. 1 illustrates one embodiment of a selectively permeable laminate that could be used in, for example, an article of apparel. In the embodiment shown, the laminate contains the following elements: a continuous N-halochitosan film (1); a substrate to which the continuous N-halochitosan film is adhered (2); additional layers (3,3'); an inner liner (4); an outer shell (5) and adhesive (6,6'). However, not all embodiments of the selectively permeable laminates contain all of the elements shown in FIG. 1.

Because the laminates are selectively permeable, we have found that a structure fabricated therefrom provides a protective barrier that inhibits the permeation through the laminate, and thus through the structure, of chemical and biological agents that may be harmful to humans while maintaining sufficient water vapor permeability to maintain personal comfort when the laminate is used to fabricate an item of apparel.

N-HALOCHITOSAN

Synthesis of N-halochitosans is described in, for example, U.S. Pat. No. 5,362,717. N-chlorochitosan, N-bromochitosan, and N-iodochitosan have all been prepared. The treatment of chitosan or an aqueous solution of a chitosan salt with an appropriate halogenating agent results in the conversion of some to essentially all of the 2-deoxy-2-aminoglucose monomeric units present in chitosan to 2-mono or 2,2-dihalo aminoglucose monomeric units.

The term "halogenating agent" is used in the conventional sense of being those agents having halogen bound to a strongly electronegative atom such as oxygen, nitrogen, or another halogen, and capable of donating a positively charged halogen atom. Examples of suitable halogenating agents include without limitation: sodium hypochlorite, calcium hypochlorite, chlorine, bromine, iodine, aqueous chlorine solutions, aqueous bromine solutions, N-chlorosuccinimide, sodium hypobromite, pyridinium bromide perbromide, N-bromosuccinimide, chloramine-T (also known as N-chloro-4-methyl-benzenesulfonamide, sodium salt) and the like. Other suitable halogenating agents will be readily apparent to those skilled in the art. In one embodiment, the halogenating agent is sodium hypochlorite because of its ready availability and low cost.

N-halochitosans can be prepared by direct action of the halogenating agent on chitosan or by action of the halogenating agent on an aqueous solution of a chitosan salt. In aqueous solution, the halogenating agent is not concentrated at the surface of the chitosan. The concentration of chitosan salt may be from about 0.1 to 5.0% preferably from about 0.2-2%. The formation of N-halochitosans can be conducted at 0° to 80° C., preferably at 15° to 30° C., to optimize reaction rate and minimize decomposition of the product.

The halogenating agent can be employed at levels of from about 0 to 3 stoichiometric equivalents of available halogen per equivalent of 2-aminoglucose monomeric units in the chitosan. Depending on the amount of halogenating agent employed, the degree of halogen substitution on the 2-aminoglucose unit will vary from about 0 to 2 halogen atoms per 2-aminoglucose unit. Depending on the halogenating agent chosen, the reaction is generally complete in 1-60 minutes. When sodium hypochlorite is chosen, the reaction is very rapid and is typically complete in less than 10 minutes. Less reactive halogenating agents such as N-bromosuccinimide may require 30-60 minutes or even longer depending on temperature. The N-halochitosan may be isolated from the reaction mixture by conventional techniques such as filtration or centrifugation.

The N-halochitosan has two modes of action against hazardous chemicals. In the first, it physically inhibits the permeation of the chemicals through its films, and, secondly, it reacts with the hazardous material chemically, oxidizing it, thereby eliminating the hazard. Because of the latter property, the N-halochitosan can be used effectively not only in the form of a continuous film, but as a powder supported between layers of fabric, adhered onto fabric, or impregnated into, for example, a polyurethane foam. The N-halo group of the N-halochitosan is consumed as it destroys the hazardous material, thereby reforming the chitosan. The resulting laminate of spent N-halochitosan, in powder or film form, can be regenerated by treatment with the halogen or, preferably, dilute sodium hypohalite aqueous solution at room temperature.

N-Chlorochitosan is stable in air for at least three weeks at room temperature. Chlorine is lost when N-chlorochitosan is exposed to solutions of strong bases, such as sodium hydroxide or sodium carbonate ($Na_2CO_3$), but not weaker bases such as $NaHCO_3$. However, the N-chloro groups lost by exposure to strong base can be regenerated by treatment with chlorine or, preferably, dilute sodium hypochlorite aqueous solution (for example, 1%) at room temperature.

Film Preparation

Chitosan, from which N-halochitosan is prepared, is the commonly used name for poly-[1-4]-β-D-glucosamine. It is commercially available and is chemically derived from chitin, which is a poly-[1-4]-β-N-acetyl-D-glucosamine that, in turn, is derived from the cell walls of fungi, the shells of insects and, especially, crustaceans. In the preparation from chitin, acetyl groups are removed by treatment with strong inorganic bases like sodium hydroxide, and, in the chitosan used herein, the degree of deacetylation is at least about 60%, and is preferably at least about 85%. As the degree of deacetylation increases, it becomes easier to dissolve chitosan itself in acidic media.

Suitable chitosan-based moieties for halogenation include chitosan itself, chitosan salts, and water-soluble derivatives of chitosan. The number average molecular weight ($M_n$) in aqueous solution of the chitosan used herein is at least about 10,000.

A preferred method for preparing the N-halochitosan film is to halogenate a chitosan film directly by exposing the chitosan film to a halogenating agent such as chlorine gas or solution, sodium hypochlorite solution, iodine, aqueous bromine solutions, and others such as those listed previously. Methods for preparing the chitosan film are described in U.S. Patent Publication No. 2007/0196404. The halogenation of chitosan occurs randomly on the chitosan's nitrogens, and generally only about 5% to 30% of the nitrogens are chlorinated. The chitosan may contain any of a variety of additives up to 50 wt % based on the sum of chitosan plus additives: organic polymers, including without limitation, natural polymers such as starch, cellulose, chitosan or N-methylchitosan, and synthetic polymers such as polyurethanes, polyamides, and polyesters; inorganic fillers, including without limitation, glass spheres, glass bubbles, clays (e.g., sepiolite, attapulgite, and montmorillonite) and the like; or flame retardants, plasticizers, stabilizers, tougheners, and the like, to enhance various properties of the chitosan film such as strength, flexibility, fire resistance and dimensional stability, before it is halogenated.

An N-halochitosan film may also be produced by casting from solution using the methods for casting chitosan films with minor modifications. For example, care must be taken not to use solvents or other additives that react with the N-halochitosan other than to form a salt. Additionally, the N-halochitosan should not be exposed to strong bases or to temperatures above about 80° C.

Since N-halochitosan, like chitosan itself, is not soluble in water it must be made soluble for casting from aqueous solution. Solubility is conveniently obtained by adding the N-halochitosan to a dilute solution of a water-soluble acid that does not react with the N-halochitosan other than to form a water-soluble salt, herein referred to as a "N-halochitosan salt" or "N-halochitosan as the (acid anion) thereof", for example "N-halochitosan as the acetate thereof" if acetic acid was used. N-Halochitosan derivatives that are water-soluble can be used directly in water without the addition of acid. The amount of acid used to solubilize the N-halochitosan can be chosen to control the viscosity so that it is appropriate viscous for film casting. If too little acid is added, the resulting solution may be too viscous to cast a thin film and/or to be filtered. The desired amount of acid used will also depend on the desired N-halochitosan concentration in the solution from which the film is cast. It will depend as well on the molecular weight and degree of deacetylation of the starting N-halochitosan, since those properties determine the molar concentration of amino groups ($-NH_2$) available to react with the acid. Preferably, about one acid equivalent is added per mole of unchlorinated amine groups ($-NH_2$).

The appropriate concentration of N-halochitosan in the final solution will vary depending on how the solution is to be applied, and also on the molecular weight of the N-halochitosan, as a lower concentration may be desired for a relatively high molecular weight N-halochitosan. Different application methods work best with solutions of different viscosities, but typically, the solution will contain from about 0.1 to about 15 wt % N-halochitosan, based on the total combined weight of the solution and the N-halochitosan.

The N-halochitosan solution from which the film is prepared may include organic polymers, including without limitation, natural polymers such as starch, cellulose, chitosan or N-methylchitosan, and synthetic polymers such as polyurethanes, polyamides, and polyesters. Such polymers may be soluble or insoluble in the N-halochitosan solution.

The N-halochitosan solution from which the film is prepared may include inorganic fillers, including without limitation, glass spheres, glass bubbles, clays (e.g., sepiolite, attapulgite, and montmorillonite) and the like. Small amounts of such fillers, preferably less than 10 wt %, could be used to increase thermal stability, modulus, and barrier properties of the N-halochitosan film where this is desirable.

The N-halochitosan solution from which the film is prepared may include additives such as flame retardants, plasticizers, stabilizers, tougheners, and the like, to enhance various properties of the N-halochitosan film such as strength, flexibility, fire resistance and dimensional stability. Additives to an N-halochitosan solution may be soluble in the solution, or they may be present as dispersed insoluble material. The additives are present at less than 50% by weight, based on the total combined weight of N-halochitosan and additives.

An N-halochitosan film may be prepared by casting an N-halochitosan solution directly onto a substrate that will be incorporated along with the film into a laminate. Alternatively, the N-halochitosan solution may be cast onto a work device such as a smooth surface, such as glass or a polymer film (for example, polyester film). If the film is cast onto a work device, the film is then dried, detached and then incorporated into a laminate in a separate step. The solution may be applied to a substrate by any of a variety of methods known in the art, as taught regarding chitosan films in U.S. Patent Publication No. 2007/0196404. The method chosen will depend on several factors, such as the rheology of the solution to be applied, the desired wet film thickness, the speed of a substrate that is traveling, and the required coating accuracy as a percent of total thickness. The applied solution is then dried as quickly as possible and at a temperature below about 75° C. The result of the drying at this stage is a continuous film.

If a film at this stage is water-soluble, it can be made water-insoluble by reacting it with a crosslinking reagent. A crosslinking agent is a reactive additive that creates bonds, i.e. crosslinks, between polymer chains. In one embodiment, a crosslinked N-halochitosan film is prepared by first preparing a crosslinked chitosan film and then halogenating it.

Alternatively, any of a variety of crosslinking agents can be added to a solution before a film is cast therefrom. Examples of crosslinking agents for N-chlorochitosan include without limitation epichlorohydrin ( ), and di-, and tri-carboxylic acids including succinic, malic, tartaric, and citric acids. Diacids such as adipic acid or other multifunctional acids such as levulinic acid, glyoxylic acid or halogenated organic acids, can be used to make the N-chlorochitosan solution. With these additives, temperatures of about 65-75° C. for several minutes up to an hour can cause insolubility. Crosslinking agents may also be applied to the film after it is dried.

An N-halochitosan film can also be made water-insoluble by contacting it with a weak base, such as $NaHCO_3$, and, then washing, which converts the film from the N-halochitosan salt form to free N-halochitosan. If the film to be treated with base is attached to a substrate, the composition and concentration of the base will be influenced by the nature of the substrate (e.g., its reactivity toward base) and processing conditions (e.g., temperature and contact time, continuous versus batch process). Typically, the base is a 1% to 10% by weight aqueous solution of $NaHCO_3$, and typical contact times are 30 seconds to 3 hours at ambient temperature. Heat treatment as described above plus contact with base could also be used to render the film insoluble.

Substrate Materials

Substrates for Continuous N-Halochitosan Film

Although a free-standing N-halochitosan film can be incorporated into a protective article, it can also be adhered to a substrate. Referring to FIG. 1, an N-halochitosan film 1 may be prepared by casting an N-halochitosan solution directly onto a substrate 2 that will be incorporated along with the film into a laminate. It can also be cast on a work surface like PET film and coated with an additional layer or layers before or after the work surface is removed and discarded. In certain cases, the substrate onto which an N-halochitosan film may be prepared may itself be a continuous sheet or film, provided that the permeability of the substrate to water vapor under use conditions is adequate for the particular end use. For example, a garment would require much higher water vapor permeability than a tent or tarpaulin.

A suitable substrate will have at least one surface that is smooth, i.e., essentially without protrusions above the plane of the substrate that are higher than the desired thickness of the coating of N-chlorochitosan that will be transformed into the film. Thus, a smoother substrate surface is required when the desired thickness of the coating of chitosan is 25 microns than when it is 100 microns.

A suitable substrate may be, for example, a film, a sheet whose permeability to water vapor under use conditions is adequate for the particular end use, a microporous membrane (i.e., one in which the typical pore size is about 0.1 to 10 micrometers in diameter), or an article prepared from any of the foregoing. It is preferred that the substrate surface that will be in contact with the N-halochitosan film be both smooth and nonporous. Suitable substrate materials include polar polymer films, including elastomers, glassy polymers, and semi-crystalline materials. A polar polymer has both dispersion and dipole-dipole forces, while a non-polar polymer has only dispersive attractive forces. Polar polymers generally contain a substantial fraction of oxygen and nitrogen containing groups, while non-polar polymers contain a substantial fraction of hydrocarbon or fluorocarbon with minimal oxygen and nitrogen containing groups.

Examples of suitable substrate materials include without limitation Nafion® perfluorosulfonic acid tetrafluoroethylene copolymer (available from E. I. du Pont de Nemours and Company, Wilmington, Del., USA), polyurethanes (e.g., polyurethane films available from Omniflex Co., Greenfield, Mass., USA), polyether block polyamide copolymers (e.g., Pebax® polyether block amides available from Arkema, Paris, France), polyether block polyester copolymers, sulfonated styrene-polyolefin di- and tri-block copolymers, and polyvinyl alcohol homopolymers and copolymers. Non-polar films can be used if the casting solution contains a neutral or cationic surfactive agent, or if the surface of the non-polar film has been altered chemically, such as by subjecting it simultaneously to oxygen and a corona discharge.

Substrates for N-Halochitosan Powder

Materials that are suitable substrates for continuous N-halochitosan films can also be used with N-halochitosan powder. Because the N-halochitosan is in the form of particles rather than a continuous film, it is not necessary that the substrate have at least one surface that is essentially without protrusions above the plane of the substrate.

The powder may be constrained mechanically and/or chemically. Mechanical methods include, without limitation, pressing the particles into a polymeric substrate; needle-punching; and quilting, wherein the N-halochitosan powder is sandwiched between layers of fabric which are then stitched or sealed together in a regular pattern. The N-halochitosan powder can also be attached using a chemical adhesive, for example, an elastomeric adhesive. The powder can be, for example, mixed with an adhesive and brushed directly onto a fabric or other substrate. It is often advantageous to use both mechanical and chemical methods for constraining the powder, for example, using both a chemical adhesive and quilting. The powder can also be dispersed in a melt-blown web of organic polymeric fibers as described for carbon powder in U.S. Pat. No. 4,433,024.

The specific amount of N-halochitosan powder used depends on the specific harmful material and is readily determined by one of ordinary skill in the art, by testing the permeability of the structure containing the N-halochitosan powder to that harmful material or an accepted simulant for it.

N-Halochitosan Powder/Polyurethane Foam

It may be convenient and provide ease in handling for the N-halochitosan powder to be incorporated into a polyurethane foam layer in the manner used to incorporate sorptive carbon into protective structures, as in, for example, U.S. Pat. No. 4,046,939 and U.S. Pat. No. 6,699,917. For example, open cell solid flexible polyurethane foam may be impregnated with a suspension or dispersion of N-halochitosan powder, after which excess liquid is removed and the foam is dried. Alternatively, it may be possible to incorporate N-halochitosan powder into a polyurethane foam by blending, heating, and foaming a mixture of isocyanate and polyol, with the proviso that the temperature is not high enough to degrade the N-halochitosan and it does not react with the other ingredients. The N-halochitosan/polyurethane foam materials can then be incorporated into the protective structures described herein, for example, in the form of layers.

The specific amount of N-halochitosan powder incorporated into the foam depends on the specific harmful material and is readily determined by one of ordinary skill in the art, by testing the permeability of the structure containing the N-halochitosan powder to that harmful material or an accepted simulant for it.

Additional Layers

The protective laminates described herein comprise N-halochitosan and at least one layer of fabric. As appropriate, additional layers (for example, a second fabric layer or a microporous membrane) can be used in a laminate with the objective of (a) creating a composite structure that protects the N-halochitosan from an environment that may degrade its performance, and/or (b) creating a laminate, and potentially thus a composite structure thereof, that has features in addition to those offered only by the chitosan film and the at least one fabric layer, and/or (c) improving the performance of the final structure. For example, additional films or microporous membranes may be applied to the outer surfaces of an N-halochitosan film and, where present, the substrate, as shown in FIG. 1 (3, 3') by coating, thermal lamination, and other means known in the art, to protect the N-halochitosan and substrate films from dust and liquids or physical damage. One or more layers of ballistic fabrics can be used to absorb the impact of a projectile and protect the wearer from harm.

In many end uses, particularly apparel, N-halochitosan powder or film (and associated substrate, where present) or N-halochitosan/polyurethane foam is incorporated into a structure that includes an outer layer of material (an "outer shell," 5 in FIG. 1) which is exposed to the environment and/or an inner liner 4.

The outer and inner materials may each be chosen for functional reasons such as ruggedness, ballistic resistance, and resistance to abrasion or tearing, as well as to impart a comfortable feel and a fashionable appearance to apparel. Colored and patterned materials may also be used as outer layers to introduce camouflage features in military applications. The outer shell and inner liner materials are typically fabric or microporous membranes.

Fabrics may be wovens or nonwovens (e.g., nonwoven sheet structures created by spun bonded/melt blown processes or by electrospinning as described in, e.g., Z.-M. Huang et al., Composites Science and Technology (2003), 63, 2223-2253). Fabrics may be prepared from any synthetic or natural fiber appropriate for the specific end use in mind. Preferred fabrics may be prepared from aramids, nylons, polyesters, cotton, and blends comprising any of these, such as, but not limited to blends of nylon and cotton fibers ("NYCO"). The term "nylon" as used herein refers to polyamides other than aramids. An aramid is an aromatic polyamide, wherein at least 85% of the amide (—CONH—) linkages are attached directly to two aromatic rings. Flame retardant fibers, including aramids (preferably up to 40%) may be blended with an aramid to impact fabric thermal performance and comfort. A suitable aramid may be in the form of a copolymer that may have as much as 10 percent of other diamine(s) substituted for the diamine of the aramid or as much as 10 percent of other diacid chloride(s) substituted for the diacid chloride of the aramid. A p-aramid would be preferred in a fabric as used in this invention, and poly(p-phenylene terephthalamide) (PPD-T) is the preferred p-aramid. M-aramids may also find use in the present invention, and poly (m-phenylene isophthalamide) (MPD-I) is the preferred m-aramid. P-aramid and m-aramid fibers and yarns particularly suitable for use in the present invention are those sold respectively under the trademarks Kevlar® and Nomex® (E. I. du Pont de Nemours and Company, Wilmington Del., USA), and Teijinconex®, Twaron® and Technora® (Teijin Ltd., Osaka, Japan), and equivalent products offered by others. Typically, the aramid fabric would be used in the outer shell, and the inner liner would more likely contain fabric such as polyester, nylon, cotton, or blends thereof, though m-aramids may be utilized as part of the inner liner as well to improve fire resistance.

Films and microporous membranes may be prepared from any synthetic or natural material appropriate for the specific end use in mind. Examples of films and microporous membranes that can be used as a component of inner liners or outer shells include without limitation expanded poly(tetrafluoroethylene) membranes such as those sold under the trademark GORE-TEX® (W. L. Gore & Associates, Inc., Newark, Del., USA); hydrophobic polyurethane microporous membranes (see, e.g., S. Brzezinski et al., Fibres & Textiles in Eastern Europe, January/December 2005, 13(6), 53-58); microporous (poly)propylene available from,e.g., 3M (St. Paul, Minn., USA); thin films of thermoplastic polyurethane such as those sold under the trademark Transport® Brand Film by Omniflex (Greenfield, Mass., USA); Pebax® polyether block amide by Arkema (Paris, France); and DuPont™ Active Layer, a polyester film available from E. I. du Pont de Nemours and Company (Wilmington, Del., USA).

Fabrication

The selectively permeable laminates described herein can be assembled using any of the any of the sewing, stitching, stapling or adhering operations, such as thermally pressing, known in the art.

Referring to FIG. 1, the layers to be assembled may include an N-halochitosan film 1 and at least one other layer. For example, if the chitosan film is cast on a work device, the film is then dried and detached as a free-standing film. Alternatively, element 1 could be a layer of polyurethane foam impregnated with N-halochitosan powder, or a film or fabric to which N-halochitosan powder has been attached mechanically or with a chemical adhesive. Other layers could be added either before or after detachment from the work device. It may then be attached to another layer (for example, substrate, outer shell, inner liner) using an adhesive such as a polyurethane-based adhesive; the adhesive may be present as a continuous layer, an array of adhesive dots, or in a number of alternative patterns such as lines or curves. The adhesive may be applied in a variety of ways including spraying or gravure roll.

Similarly, N-halochitosan powder can be constrained mechanically and/or by using a chemical adhesive. Methods for constraining the powder mechanically include pressing it into a polymer substrate, placing the powder between layers of fabric and quilting the fabric; needle punching; and dispersing the powder in a polyurethane foam.

To fabricate a structure or other article from a laminate disclosed herein, such as an item of apparel, the laminate may be sandwiched between (additional) woven fabrics. Bonding between a film or foam structure and the fabrics may be continuous or semicontinuous, for example, with adhesive dots or films. Alternatively, the bonding may be discontinuous, for example by sewing the edges together, an arrangement often referred to as a "hung liner." Other means of discontinuous bonding may include the use of Velcro® strips or zippers.

An assembled structure can also be made comprising a continuous chitosan film or chitosan powder wherein the film or powder is halogenated after the structure is assembled using halogen, hypohalite solution, etc. Similarly, a structure comprising N-halogenated chitosan film or powder that has lost halogen by reaction in use can be regenerated easily by treatment with a suitable halogenating agent. Care must be taken that the halogenating agent is not harmful to the other components of the assembled structure.

Uses

The laminate, as well as the continuous N-halochitosan film itself, is selectively permeable, having a Moisture Vapor Transport Rate ("MVTR") of at least 2 kg/m$^2$/24 h, while the transport rate of materials harmful to human health is low enough to prevent the occurrence of injury, illness or death. The specific transport rate needed will necessarily depend on the specific harmful material; for example, NFPA 1994, 2006 Revision requires <4.0 µg/cm$^2$ one hour cumulative permeation for mustard and <1.25 µg/cm$^2$ for Soman, both of which requirements are met by the laminates described herein and the continuous N-halochitosan film itself. Consequently, the laminates, as well as the continuous N-halochitosan film itself, can be used for the fabrication of, or as a component in, a variety of articles of manufacture, including articles of protective apparel, especially for clothing, garments or other items intended to protect the wearer or user against harm or injury as caused by exposure to toxic chemical and/or biological agents, including without limitation those agents potentially used in a warfighter environment and materials identified as "Toxic Industrial Chemicals" (TICs) or "Toxic Industrial Materials" (TIMs); see, for example, *Guide for the Selection of Chemical and Biological Decontamination Equipment for Emergency First Responders, NIJ Guide* 103-00, *Volume I*, published by the National Institute of Justice, U.S. Department of Justice (October 2001). A few examples of TICs are phosgene, chlorine, parathion, and acrylonitrile. Permeability of the laminate or a layer in the laminate to specific substances may be determined by various methods including, without limitation, those described in ASTM F739-91, "Standard Test Method for Resistance of Protective Clothing Materials to Permeation by Liquids or Gases Under Conditions of Continuous Contact."

In one embodiment, the item of apparel is useful to protect military personnel against dermal exposure to chemical and biological agents potentially encountered in a warfighter environment. Examples of such agents include without limitation nerve agents, vesicant agents, tear gases (riot control agents), and human pathogens. Examples of nerve agents include without limitation: Sarin ("GB," O-isopropyl methylphosphonofluoridate), Soman ("GD," O-pinacolyl methylphosphonofluoridate), Tabun ("GA," O-ethyl N,N-dimethylphosphoramidocyanidate), and VX (O-ethyl S-2-diisopropylaminoethyl methylphosphonothiolate). Examples of vesicant agents include without limitation: sulfur mustards (e.g., bis(2-chloroethyl)sulfide and bis(2-chloroethylthio)methane), Lewisites (such as 2-chlorovinyldichloroarsine), and nitrogen mustards (such as bis-(2-chloroethyl)ethylamine ("HN1")). Examples of tear gases include without limitation: pepper spray (various capsaicinoids), bromobenzyl cyanide ("CA"), phenylacyl chloride ("CN"), o-chlorobenzylidene malononitrile ("CS"), and dibenzoxazepine ("CR"). Examples of human pathogens include without limitation: viruses (e.g., encephalitis viruses, Ebola virus), bacteria (e.g., *Rickettsia rickettsii, Bacillus anthracis, Clostridium botulinum*), and toxins (e.g., ricin, cholera toxin, anthrax toxin). A human pathogen is an agent, especially a microorganism that causes disease in humans.

In a further embodiment, the item of apparel is useful to protect first responder personnel from known or unknown chemical or biological agents potentially encountered in an emergency response situation. In yet another embodiment, the item is intended to protect cleanup personnel from chemical or biological agents during a hazmat response situation. Examples of hazardous material in addition to those listed above include certain pesticides, particularly organophosphate pesticides, such as parathion.

Such clothing, garments or other items include without limitation coveralls, protective suits, coats, jackets, limited-use protective garments, raingear, ski pants, gloves, socks, boots, shoe and boot covers, trousers, hoods, hats, masks and shirts.

In another embodiment, the laminates can be used to create a protective cover, such as a tarpaulin, or a collective shelter, such as a tent, to protect against chemical and/or biological warfare agents.

Furthermore, the laminates can be used in various medical applications as protection against toxic chemical and/or biological agents. In one embodiment, the laminates could be used to construct items of apparel for health care workers, such as medical or surgical gowns, gloves, slippers, shoe or boot covers, and head coverings.

EXAMPLES

Specific embodiments of the present invention are illustrated in the following examples. The embodiments of the invention on which these examples are based are illustrative only, and do not limit the scope of the appended claims.

The meaning of the abbreviations used in the examples is as follows: "cm" means centimeter(s), "conc." means concentration, "cP" means centipoise, "DMMP" means dimethylmethylphosphonate, "g" means gram(s), "GC" means gas chromatography, "h" means hour(s), "IC" means ion chromatography, "kg" means kilogram(s), "M" means molar, "m" means meter(s), "mg" means milligram(s), "min" means minute(s), "mL" means milliliter(s), "$M_n$" means number average molecular weight, "MVTR" means moisture vapor transmission rate, "$M_w$" means weight average molecular weight, "oz" means ounce(s), "Pa" means Pascal(s), "s" means second(s), "SEC" means size exclusion chromatography, "wt %" means weight percent, "yd" means yard(s), "µg" means microgram(s), "µL" means microliter(s), and "µm" means micrometer(s).

Unless otherwise specified, the water used is distilled or deionized water.

The chitosan material used in the following Examples was ChitoClear® TM-656, obtained from Primex Ingredients ASA, Norway under the trademark ChitoClear® chitosan, as noted. According to the manufacturer, Primex ChitoClear® TM-656 has a Brookfield viscosity of 26 cP (0.026 Pa·s, 1% chitosan in a 1% aqueous acetic acid solution). The $M_n$ and $M_w$ were determined by SEC to be 33,000 and 78,000, respectively.

Methods

Standard Glass Plate Preparation

When films are to be cast onto a work device such as a glass plate, it is important that the glass plate surface be clean. The following cleaning procedure was used for the examples, but any thorough cleaning procedure would be suitable. A Pyrex® glass plate is washed with PEX lab soap, rinsed with water, and wiped dry. The plate is then cleaned with methanol and, finally, coated and rubbed with 10 wt % aqueous NaOH solution and allowed to stand for ten minutes. The plate is ready for casting after a final rinse with water and drying with soft paper towels.

Molecular Weight Determination

The molecular weight of the chitosan used to prepare the N-halochitosan was determined by size exclusion chromatography using a triple-detector aqueous system, consisting of a Waters 2690 separations module, a Wyatt-DAWN DSP multi-angular (18) light scattering detector, a Waters 410 differential refractometer (Waters Corporation, Milford, Mass., USA), and a Viscotek T60-B viscometer (Viscotek, Houston, Tex., USA). Two TSK-GEL GMPW columns (TOSOH Bioscience LLC, TOSOH Corporation, Tokyo, Japan) are used. The mobile phase is an aqueous solution of 0.3 M acetic acid with 0.3 M sodium acetate at a flow rate of 0.5 mL/min. The samples have been first dissolved for 4 hours in a shaker.

Moisture Vapor Transmission Rate (MTVR)

This is measured by a method derived from the Inverted Cup method of MVTR measurement [ASTM E 96 Procedure BW, Standard Test Methods for Water Vapor Transmission of Fabrics (ASTM 1999)]. A vessel with an opening on top is charged with water and then the opening is covered first with a moisture vapor permeable (liquid impermeable) layer of expanded-PTFE film ("ePTFE"), and then with the sample for which the MVTR is to be measured, and finally, covered by woven fabric overlayer [NYCO 50:50 nylon/cotton blend, 6.7 oz/yd$^2$ (0.23 kg/m$^2$) or Nomex® fabric, 5.6 oz/yd$^2$ (0.19 kg/m$^2$), both treated with durable water repellant finish]. The three layers are sealed in place thereby forming a laminate, inverted for 30 minutes to condition the layers, weighed to the nearest 0.001 g, and then contacted with a dry stream of nitrogen while inverted. After the specified time, the sample is re-weighed and the MVTR calculated (kg/m$^2$/24 h) by means of the following equation:

$$MVTR = 1/[(1/MVTR_{obs.}) - (1/MVTR_{mb})]$$

where MVTR$_{obs}$ is observed MVTR of the experiment and MVTR$_{mb}$ is the MVTR of the ePTFE moisture barrier (measured separately). The reported values are the average of results from four replicate samples. In a like manner, the N-halochitosan powder replaces the N-halochitosan film to form the powder/laminate.

Dimethylmethylphosphonate ("DMMP") Permeation

DMMP is used as a relatively non-toxic simulant for chemical warfare G-class nerve agents. The DMMP permeation for the examples described below was carried out as follows: a vessel with an opening on top was charged with a measured amount of water containing 0.100% propylene glycol as an internal GC standard. If the sample was a film, the opening was covered with the sample film and a woven fabric overlayer [NYCO 50:50 nylon/cotton blend, 6.7 oz/yd$^2$ (0.23 kg/m$^2$) or Nomex®, 5.6 oz/yd$^2$ (0.19 kg/m$^2$), both treated with durable water repellant finish] was placed on top of the film, and the layers were sealed in place. If the sample was a laminate that already had a fabric surface, no additional fabric overlayer was used. In both types of samples, the fabric surface was treated with one 2 μL drop of DMMP (2.3 mg). The vessel was placed in a nitrogen-purged box for 17 h and then the DMMP concentration in the water was measured by GC analysis. Results are reported in μg of DMMP measured in the water after 17 h and are the average of five replicate samples. The DMMP was obtained from Aldrich Chemical Company (Milwaukee, Wis., USA) and was used as received.

Chlorine Analysis

The chlorine content of treated chitosan samples was quantitatively determined by ion chromatography:
A qualitative test for the presence of nitrogen-chlorine bonds was also used, based on the following reaction:

See *Advanced Inorganic Chemistry* by Cotton and Wilkinson, John Wiley & Sons, Interscience, New York 4th Ed. (1980), p 567. Since the complex NaI$_3$ is dark brown, this provides a convenient qualitative test for the chlorination of the chitosan nitrogens, with a darker color indicating a higher degree of chlorination. The test is referred to herein as the "iodine test," with the phrase "strong (weak) iodine test results" denoting production of a strongly (weakly) colored solution upon addition of NaI.

Example 1

Preparation of N-Chlorochitosan Powder Using Chlorine Gas 4.7 grams of powdered chitosan was placed in a one-quart (0.95 liter) jar filled with chlorine gas for 30 min at room temperature, then placed in air to permit any unreacted absorbed chlorine escape. The weight gain of the powdered chitosan was determined to be 3%. The chlorine content was found by to be 7.82% IC analysis, indicating about 40% of the chitosan nitrogens had been chlorinated.

Example 2

Preparation of N-Chlorochitosan Film Using Chlorine Gas

Two chitosan films were placed a one-quart (0.95 liter) jar filled with chlorine gas at room temperature, then placed in air to permit any unreacted absorbed chlorine escape. Sample 1) was exposed to the chlorine for 1 minute and Sample 2) for 10 minutes. Samples 1) and 2) were then washed with aqueous sodium bicarbonate, followed by a water wash and drying, in order to remove any chlorine that may have been present as the hydrochloride salt of unacetylated or unchlorinated nitrogens. Sample 3) was a section of Sample 2) that was not washed with sodium bicarbonate.

MVTR and DMMP transport rate were measured and are presented in Table 1.

TABLE 1

| Sample | Cl$_2$ exposure (min) | Washed with sodium bicarbonate? | MVTR (kg/m$^2$/24 h.) | DMMP (μg in 17 h) |
|---|---|---|---|---|
| 1) | 1 | Yes | 21.7 | 2 |
| 2) | 10 | Yes | 32 | 1 |
| 3) | 10 | No | 27.7 | 0 |

Example 3

Preparation of N-Chlorochitosan Powder Using Sodium Hypochlorite

Powdered chitosan (10.7 g) was suspended in 70 mL of 1.5% sodium hypochlorite in water in a round jar. The mixture was rotated on a mill for 30 min at room temperature. The solid N-chlorochitosan thereby produced was isolated by filtration, washed with water and dried.

Analysis: Chlorine, 1.44%, which is the equivalent to chlorination of about 8% of the chitosan nitrogens.

All of the products of Examples 1, 2, and 3 gave strong iodine tests (a dark brown color from $NaI_3$) when treated with a 1% solution of sodium iodide, which is indicative of the nitrogen-chlorine bond:

Example 4

Destruction of Nerve Agent Simulant by N-Chlorochitosan

In this experiment, the effect of chitosan and N-chlorochitosan on the simulant, DMMP, was measured. Only the N-chlorochitosan destroyed the DMMP.

7 mL of aqueous solution of DMMP, at a concentration of 330 micrograms/mL 300 mg, plus propylene glycol as an internal standard for GC analysis was mixed with 300 mg of the N-chlorochitosan powder prepared in Example 3. Another 7 mL of the aqueous solution of DMMP plus propylene glycol was mixed with 300 mg of chitosan powder. The two mixtures were tumbled end over end for 5 h at room temperature. The liquid phase of each was then analyzed by GC for the presence of DMMP. Results are presented in Table 2. The concentration of DMMP in the control solution was essentially unchanged, while no DMMP was detectable in the solution mixed with N-chlorochitosan powder.

TABLE 2

| | DMMP Concentration (µg/mL) | |
|---|---|---|
| Sample | At start | After 5 hours |
| Chitosan (control) | 330 | 328 |
| N-Chlorochitosan | 330 | 0 |

Example 5

Interaction of N-Chlorochitosan with Nerve Agent Simulant Vapor

This experiment illustrates the chemical action of N-chlorochitosan on the nerve agent simulant DMMP in the vapor phase.

1 mL of water was added to a vial that was 2.5 cm wide and 1.3 cm in diameter. On top of the vial were placed an o-ring and then a 1 cm diameter disk of 0.75 mil (19 µm) thick film of Nafion® perfluorosulfonic acid tetrafluoroethylene copolymer (obtained from E. I. du Pont de Nemours and Company, Wilmington, Del., USA). On top of the film was placed a 1 cm diameter disk of fabric onto which 0.09 g of the N-chlorochitosan powder prepared in Example 3 was placed. A second 1 cm diameter disk of fabric was placed on top of the powder. This laminate was held in place by a screw cap with the top cut out, exposing the uppermost fabric. Two drops of DMMP were placed on the exposed fabric. After 17 h, the water was analyzed by GC for the presence of DMMP.

As a control, the above procedure was repeated using chitosan powder in place of the N-chlorochitosan powder.

Results are presented below. The chitosan powder did not prevent DMMP from passing thru the laminate whereas the N-chlorochitosan completely prevented the DMMP from reaching the water.

| Sample | DMMP conc. in water after 17 h (µg/mL) |
|---|---|
| Chitosan (control) | 294 |
| N-Chlorochitosan | 0 |

Example 6

Preparation of N-Chlorochitosan Film Using Sodium Hypochlorite

Chitosan film was placed in 1% sodium hypochlorite water solution for 1 min, washed with water, placed on a glass plate, and dried. The gave a strong iodine test with sodium iodide, indicating a high degree of chlorination of the chitosan nitrogens had taken place.

Example 7

Stability of N-halochitosans in Air

A sample of N-chlorochitosan exposed to air for three weeks showed no loss in ability to convert sodium iodide to dark brown sodium iodide/iodine complex $NaI_3$.

N-bromochitosan samples prepared by exposing chitosan to bromine vapor or to NaOBr at 0° C. were less stable in air, exhibiting weak responses in the iodine test after 6 days.

Chitosan and iodine vapor formed N-iodochitosan plus a large amount of physically absorbed iodine that was released on exposure to air for a few hours, after which an equilibrium was reached.

Example 8

Preparation and Properties of N-Iodochitosan

Chitosan treated with iodine vapor gave a brown product that passed water but not the simulant.

A film of chitosan was placed in a jar having iodine crystals on the jar's bottom. The crystals were covered with glass wool to prevent them from touching the chitosan film. In this fashion, the chitosan was exposed to the iodine vapors for one week. The film had then increased in weight by 44%. When exposed to air for 3 h, the brown film lost weight, presumably from loss of physically absorbed iodine. The net weight gain was then 27%. MVTR was found to be 35.7 $kg/m^2/24$ h and DMMP transport rate was 0 µg in 17 h.

Where an apparatus or method is stated or described herein as comprising, including, containing, having, being composed of or being constituted by certain components or steps, it is to be understood, unless the statement or description explicitly provides to the contrary, that one or more components or steps other than those explicitly stated or described may be present in the apparatus or method. Alternatively, an embodiment of an apparatus or method of this invention may be stated or described as consisting essentially of certain components or steps, indicating the absence of components or steps that would materially alter the principle of operation or the distinguishing characteristics of the apparatus or method. Further, if an apparatus or method is stated as consisting of certain components or steps, components or steps other than those as stated or described are not present therein.

Where the indefinite article "a" or "an" is used with respect to a statement or description of the presence of a component in an apparatus, or a step in a method, of this invention, it is to be understood, unless the statement or description explicitly provides to the contrary, that the use of such indefinite article does not limit the presence of the component in the apparatus, or of the step in the method, to one in number.

What is claimed is:

1. A protective laminate structure comprising:
   (a) N-halochitosan, wherein the N-halochitosan is in the form of a water-insoluble powder; and
   (b) at least one layer of fabric;
   wherein the N-halochitosan is physically or chemically constrained within the laminate structure.

2. A finished article incorporating the laminate of claim 1.

3. The finished article recited in claim 2 wherein said article is selected from the group consisting of items of apparel, shelters, and protective covers.

4. The article of claim 2 wherein the article is selected from articles in the group consisting of coveralls, protective suits, coats, jackets, limited-use protective garments, raingear, ski pants, gloves, socks, boots, shoe or boot covers, trousers, hoods, hats, masks, shirts and medical garments.

5. A medical garment recited in claim 4 wherein the medical garment is selected from the group consisting of medical or surgical gowns, gloves, slippers, shoe or boot covers, and head coverings.

6. The protective structure recited in claim 1 wherein the N-halochitosan is bonded to a substrate by a chemical adhesive or is mechanically bonded to a substrate.

7. The protective structure recited in claim 6 wherein the substrate is selected from the group consisting of films, sheets, and microporous membranes.

8. The protective structure recited in claim 6 wherein the substrate comprises at least a film of one material selected from the group consisting of polar polymers wherein the polar polymer is an elastomer, glassy polymer, or semi-crystalline material.

9. The protective structure recited in claim 8 wherein the polar polymer is selected from the group consisting of perfluorosulfonic acid tetrafluoroethylene copolymers, polyurethanes, chitosan, polyether block polyamide copolymers, polyether block polyester copolymers, sulfonated styrene-polyolefin di- and tri-block copolymers, and polyvinyl alcohol homopolymers and copolymers.

10. The protective laminate structure recited in claim 1 wherein the N-halochitosan is dispersed in a polyurethane foam.

11. The protective laminate structure recited in claim 1 wherein the N-halochitosan is dispersed in a melt-blown web of organic polymeric fibers.

12. A method for protecting a person from chemically or biologically harmful agents, the method comprising the step of providing a laminate structure comprising N-halochitosan or an item of apparel comprising said laminate structure, wherein the N-halochitosan is in the form of a water-insoluble powder.

* * * * *